United States Patent
Lee et al.

(10) Patent No.: US 11,165,632 B2
(45) Date of Patent: Nov. 2, 2021

(54) METHOD FOR PERFORMING RE-ESTABLISHING RRC CONNECTION PROCEDURE AND DEVICE SUPPORTING THE SAME

(71) Applicant: LG ELECTRONICS INC., Seoul (KR)

(72) Inventors: Youngdae Lee, Seoul (KR); Bokyung Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 16/409,630

(22) Filed: May 10, 2019

(65) Prior Publication Data

US 2019/0356536 A1    Nov. 21, 2019

Related U.S. Application Data (60) Provisional application No. 62/669,937, filed on May 10, 2018.

(51) Int. Cl.
| | |
|---|---|
| *H04L 12/24* | (2006.01) |
| *H04W 74/08* | (2009.01) |
| *H04W 76/19* | (2018.01) |
| *H04W 76/27* | (2018.01) |
| *H04W 88/06* | (2009.01) |

(52) U.S. Cl.
CPC ...... *H04L 41/0654* (2013.01); *H04L 41/0803* (2013.01); *H04W 74/0833* (2013.01); *H04W 76/19* (2018.02); *H04W 76/27* (2018.02); *H04W 88/06* (2013.01)

(58) Field of Classification Search
None
See application file for complete search history.

(56) References Cited

U.S. PATENT DOCUMENTS

| | | | | |
|---|---|---|---|---|
| 2015/0133122 | A1* | 5/2015 | Chen | H04W 36/0085 455/436 |
| 2015/0208414 | A1* | 7/2015 | Ji | H04W 36/0072 455/436 |
| 2015/0264562 | A1* | 9/2015 | Wu | H04W 36/0069 380/270 |
| 2018/0160339 | A1* | 6/2018 | Wu | H04W 76/30 |
| 2019/0289510 | A1* | 9/2019 | Rugeland | H04W 36/30 |
| 2020/0275519 | A1* | 8/2020 | Sharma | H04W 76/27 |

* cited by examiner

*Primary Examiner* — Ajit Patel
*Assistant Examiner* — Pamit Kaur
(74) *Attorney, Agent, or Firm* — Lee, Hong, Degerman, Kang & Waimey (57) ABSTRACT

Provided are a method of performing RRC establishment procedure a device supporting the method. According to one embodiment of the present invention, the method includes: configuring a master cell group (MCG) cell and a secondary cell group (SCG) cell; receiving configuration related to MCG failure; detecting the MCG failure on the MCG cell; suspending MCG bearer and MCG transmission of split bearer; and transmitting a message to the SCG cell based on the configuration.

8 Claims, 10 Drawing Sheets

METHOD FOR PERFORMING RE-ESTABLISHING RRC CONNECTION PROCEDURE AND DEVICE SUPPORTING THE SAME

CROSS-REFERENCE TO RELATED APPLICATIONS

Pursuant to 35 U.S.C. § 119 (e), this application claims the benefit of U.S. Provisional Application No. 62/669,937 filed on May 10, 2018, the contents of which are hereby incorporated by reference herein in its entirety.

BACKGROUND OF THE INVENTION

Field of the Invention

The present invention relates to a wireless communication system, and more particularly, to a method for re-establishing RRC connection procedure and a device supporting the same.

Related Art

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

When operators begin to deploy NR networks, it may be considered that NR networks may not cover full coverage at the initial stage of deployment. If the operators already deployed LTE networks, the LTE networks would initially cover wider coverage than NR networks. That is, LTE networks may cover full coverage while NR networks may not. Thus, such circumstances need to be considered for our work on NE-DC specifications.

SUMMARY OF THE INVENTION

According to a prior art, when UE is moving around the edge of NR cells and leaving NR cells, UE would finally move to LTE cells rather than NR cells, because the LTE network may provide better coverage than NR network. It may mean that UE would sometimes experience RLF/HOF at the edge of NR cells and finally re-access to a neighboring LTE cell on intra-frequency or inter-frequency.

According to an embodiment of the present invention, a method performed by a user equipment (UE) in a wireless communication system is provided. The method may comprise: configuring a master cell group (MCG) cell and a secondary cell group (SCG) cell; receiving configuration related to MCG failure; detecting the MCG failure on the MCG cell; suspending MCG bearer and MCG transmission of split bearer; and transmitting a message to the SCG cell based on the configuration.

The UE may be configured to support dual connectivity (DC) for the MCG and the SCG.

The SCG cell and the MCG cell may belong to different radio access technologies (RATs), respectively.

The MCG may belong to a new radio access (NR) network and the SCG cell may belong to long-term evolution (LTE) network.

The configuration related to the MCG failure may inform whether the UE is allowed to select the SCG cell for a radio resource control (RRC) connection re-establishment procedure, when the MCG failure is detected.

The MCG failure may be at least one of radio link failure on the MCG cell or handover failure on the MCG cell.

The configuration related to the MCG failure may be transmitted from the MCG cell.

The method may further comprise: skipping random access channel (RACH) procedure for a new cell other than the SCG cell.

The UE may communicate with at least one of a mobile terminal, a network or autonomous vehicles other than the UE.

According to another embodiment of the present invention, a user equipment (UE) in a wireless communication system is provided. The UE may comprise: a transceiver for transmitting or receiving a radio signal; and a processor coupled to the transceiver, the processor configured to: configure a master cell group (MCG) cell and a secondary cell group (SCG) cell; control the transceiver to receive configuration related to MCG failure; detect the MCG failure on the MCG cell; suspend MCG bearer and MCG transmission of split bearer; and control the transceiver to transmit a message to the SCG cell based on the configuration.

The UE may be configured to support dual connectivity (DC) for the MCG and the SCG.

The SCG cell and the MCG cell may belong to different radio access technologies (RATs), respectively.

The MCG may belong to a new radio access (NR) network and the SCG cell may belong to long-term evolution (LTE) network.

The configuration related to the MCG failure may inform whether the UE is allowed to select the SCG cell for a radio resource control (RRC) connection re-establishment procedure, when the MCG failure is detected.

According to another embodiment of the present invention, a processor for a wireless communication device in a wireless communication system, wherein the processor is configured to control the wireless communication device to: configure a master cell group (MCG) cell and a secondary cell group (SCG) cell; receive configuration related to MCG failure; detect the MCG failure on the MCG cell; suspend MCG bearer and MCG transmission of split bearer; and transmit a message to the SCG cell based on the configuration.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
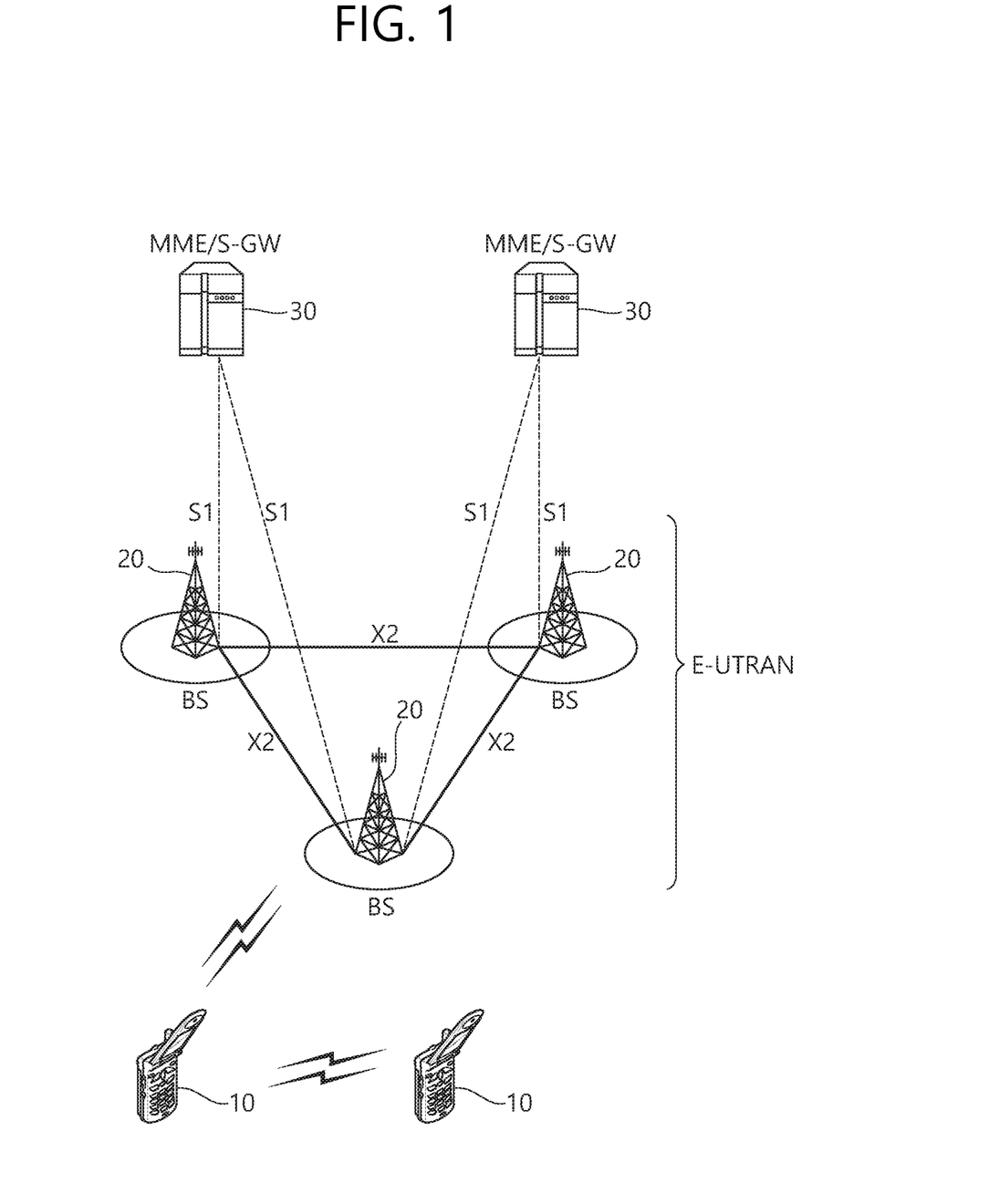
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
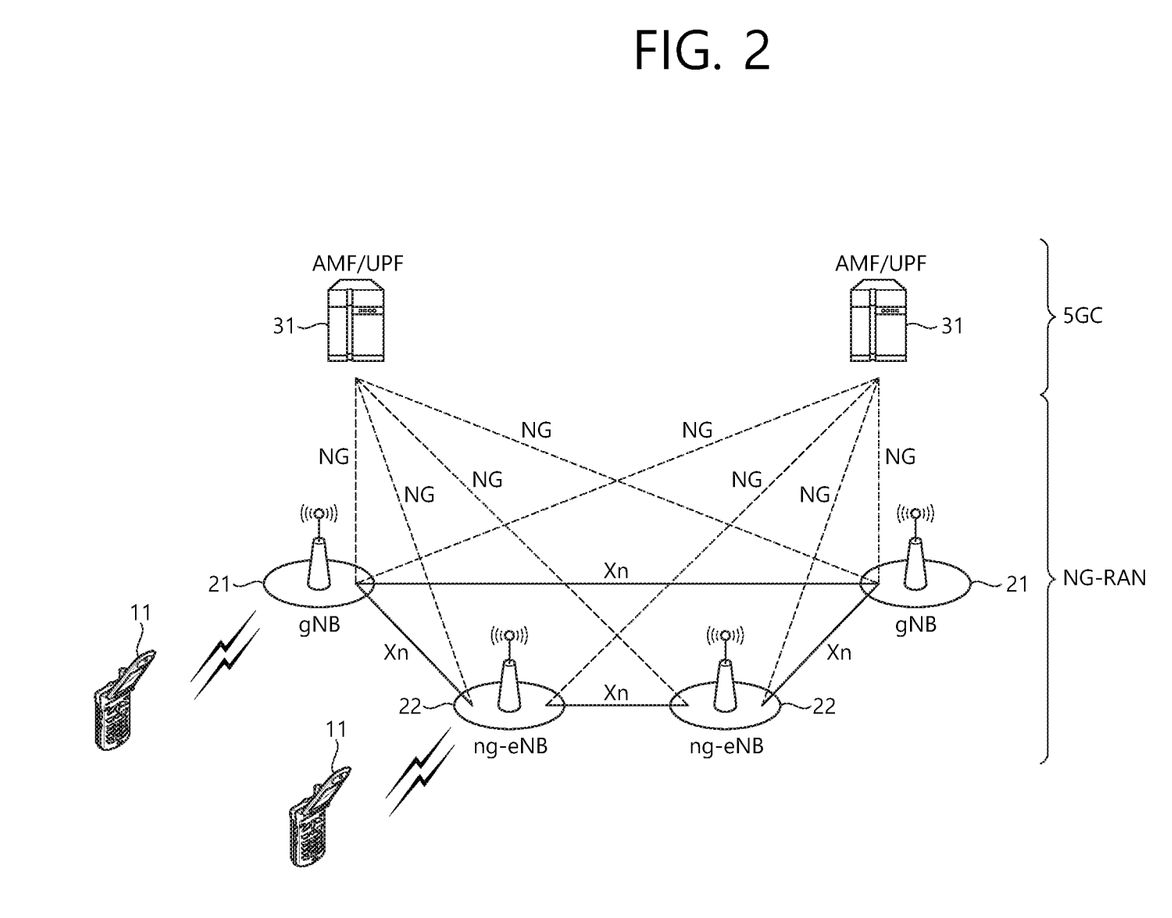
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
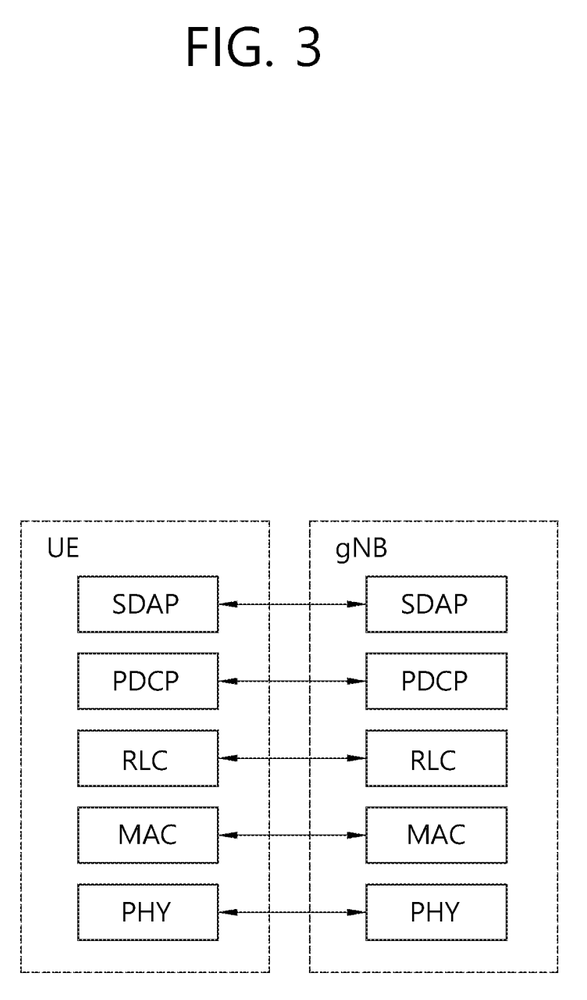
FIG. 3 shows a block diagram of a user plane protocol stack to which technical features of the present invention can be applied.
Figure 4:
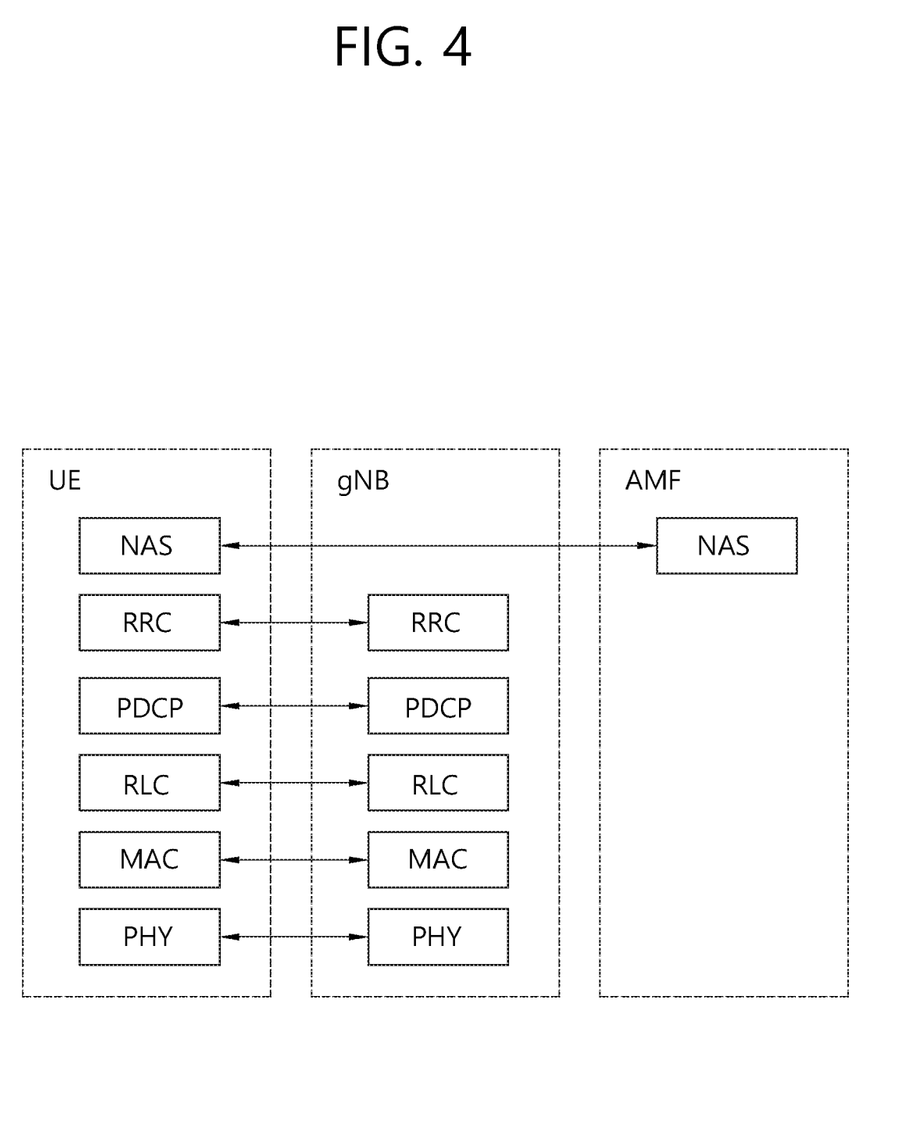
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 0.4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

RRC re-establishment procedure is described. The purpose of this procedure is to re-establish the RRC connection, which involves the resumption of SRB1 operation, the re-activation of security and the configuration of only the PCell.

A UE in RRC_CONNECTED, for which security has been activated, may initiate the procedure in order to continue the RRC connection. The connection re-establishment succeeds only if the concerned cell is prepared i.e. has a valid UE context. In case E-UTRAN accepts the re-establishment, SRB1 operation resumes while the operation of other radio bearers remains suspended. If AS security has not been activated, the UE does not initiate the procedure but instead moves to RRC_IDLE directly.

E-UTRAN applies the procedure as follows:
  to reconfigure SRB1 and to resume data transfer only for this RB;
  to re-activate AS security without changing algorithms.

Figure 5:
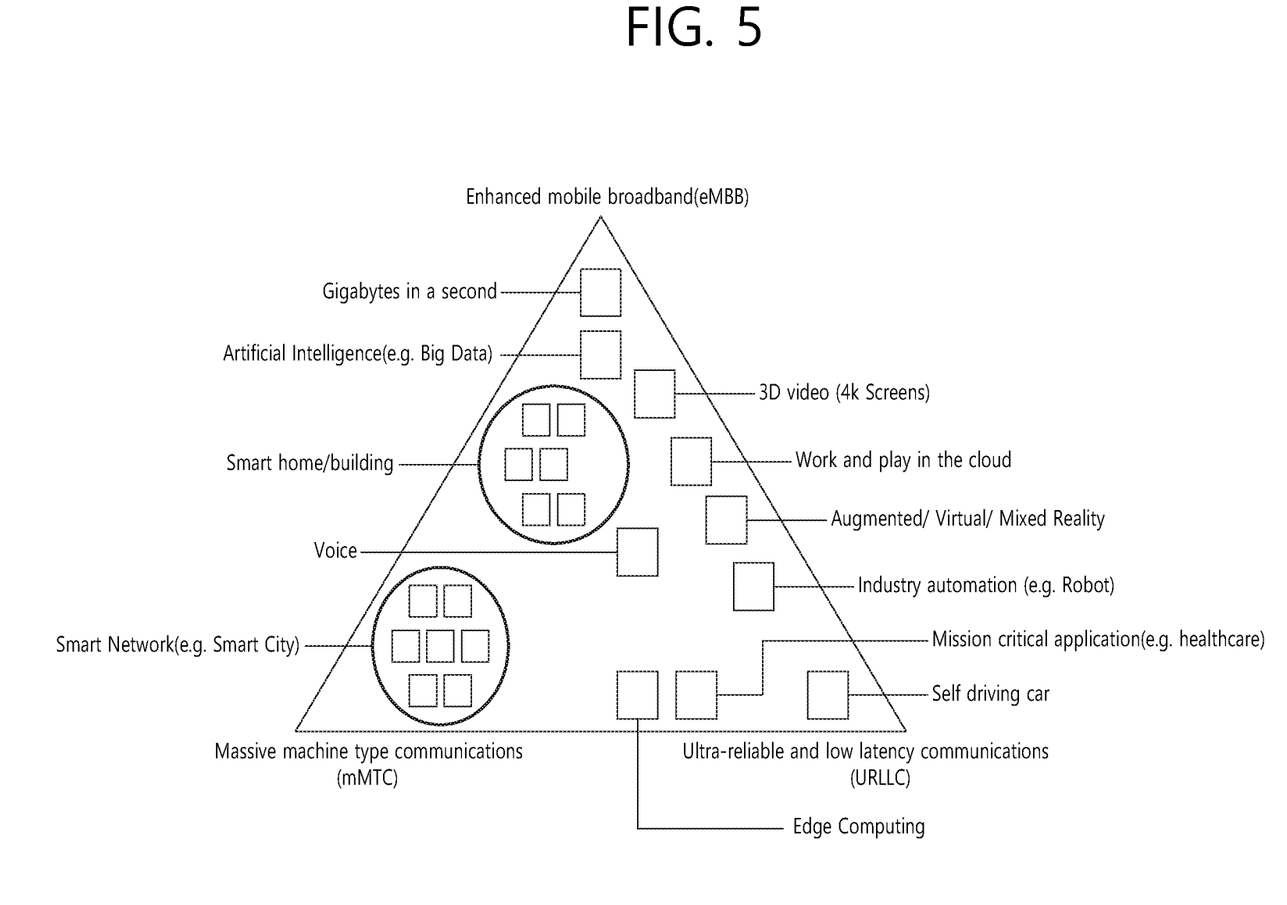
FIG. 5 shows examples of 5G usage scenarios to which the technical features of the present invention can be applied.

FIG. 5 shows examples of 5G usage scenarios to which the technical features of the present invention can be applied. The 5G usage scenarios shown in FIG. 5 are only exemplary, and the technical features of the present invention can be applied to other 5G usage scenarios which are not shown in FIG. 5.

Referring to FIG. 5, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 5 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 6:
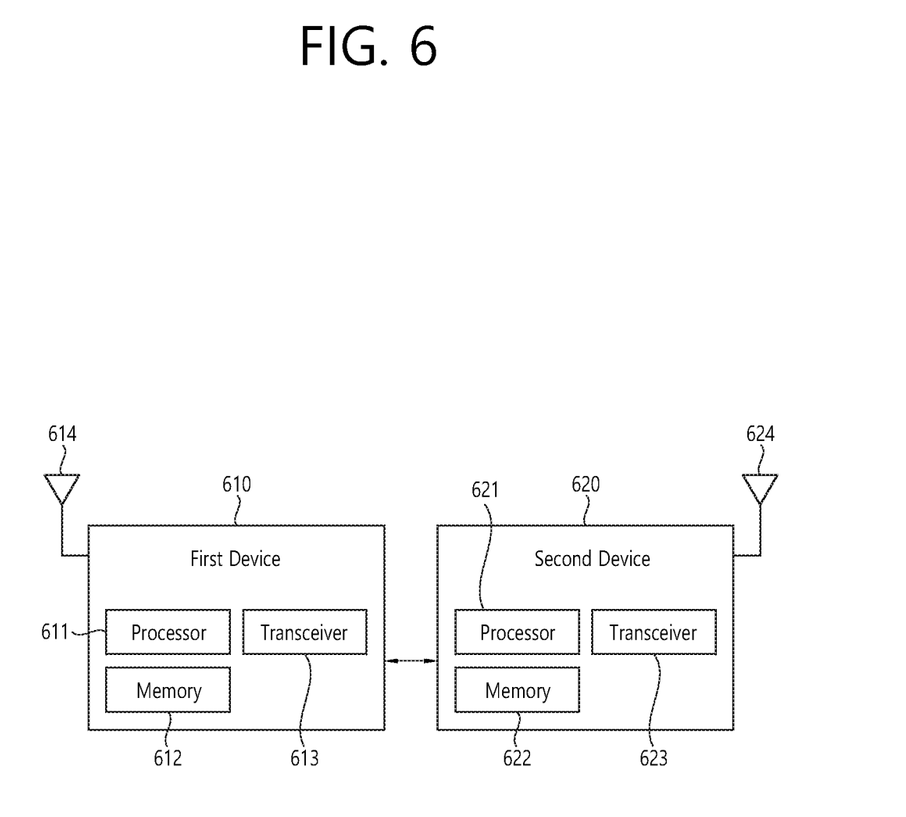
FIG. 6 shows an example of a wireless communication system to which the technical features of the present invention can be applied.

FIG. 6 shows an example of a wireless communication system to which the technical features of the present invention can be applied.

Referring to FIG. 6, the wireless communication system may include a first device 610 and a second device 620.

The first device 610 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an internet-of-things (IoT) device, a medical device, a fin-tech device (or, a financial device), a security device, a climate/environmental device, a device related to 5G services, or a device related to the fourth industrial revolution.

The second device 620 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 610 may include at least one or more processors, such as a processor 611, at least one memory, such as a memory 612, and at least one transceiver, such as a transceiver 613. The processor 611 may perform the functions, procedures, and/or methods of the present invention described below. The processor 611 may perform one or more protocols. For example, the processor 611 may perform one or more layers of the air interface protocol. The memory 612 is connected to the processor 611 and may store various types of information and/or instructions. The transceiver 613 is connected to the processor 611 and may be controlled to transmit and receive wireless signals.

The second device 620 may include at least one or more processors, such as a processor 621, at least one memory, such as a memory 622, and at least one transceiver, such as a transceiver 623. The processor 621 may perform the functions, procedures, and/or methods of the present invention described below. The processor 621 may perform one or more protocols. For example, the processor 621 may perform one or more layers of the air interface protocol. The memory 622 is connected to the processor 621 and may store various types of information and/or instructions. The transceiver 623 is connected to the processor 621 and may be controlled to transmit and receive wireless signals.

The memory 612, 622 may be connected internally or externally to the processor 611, 612, or may be connected to other processors via a variety of technologies such as wired or wireless connections.

The first device 610 and/or the second device 620 may have more than one antenna. For example, antenna 614 and/or antenna 624 may be configured to transmit and receive wireless signals.

When operators begin to deploy NR networks, it may be considered that NR networks may not cover full coverage at the initial stage of deployment. If the operators already deployed LTE networks, the LTE networks would initially cover wider coverage than NR networks. That is, LTE networks may cover full coverage while NR networks may not. Thus, such circumstances need to be considered for our work on NE-DC specifications.

If it is the case, when UE is moving around the edge of NR cells and leaving NR cells, UE would finally move to LTE cells rather than NR cells, because the LTE network may provide better coverage than NR network. It may mean that UE would sometimes experience RLF/HOF at the edge of NR cells and finally re-access to a neighboring LTE cell on intra-frequency or inter-frequency.

Thus, it seems beneficial to allow UE to select a LTE cell connected to 5GC for RRC Re-establishment. According to an embodiment of the present invention, when UE configured with NE-DC detects RLF/HOF on NR PCell, the UE may select one of serving LTE cells such as LTE PSCell, considering that UE context is already available at SN of NE-DC.

In an embodiment of the present invention, upon detection of MCG Radio Link Failure (RLF) or handover failure (HOF), UE may perform switching between MCG and SCG in RRC Re-establishment. Namely, UE may trigger change from MCG to SCG and change from SCG to MCG (i.e. change from PCell to PSCell and change from PSCell to PCell) during or before RRC Re-establishment procedure.

Figure 7:
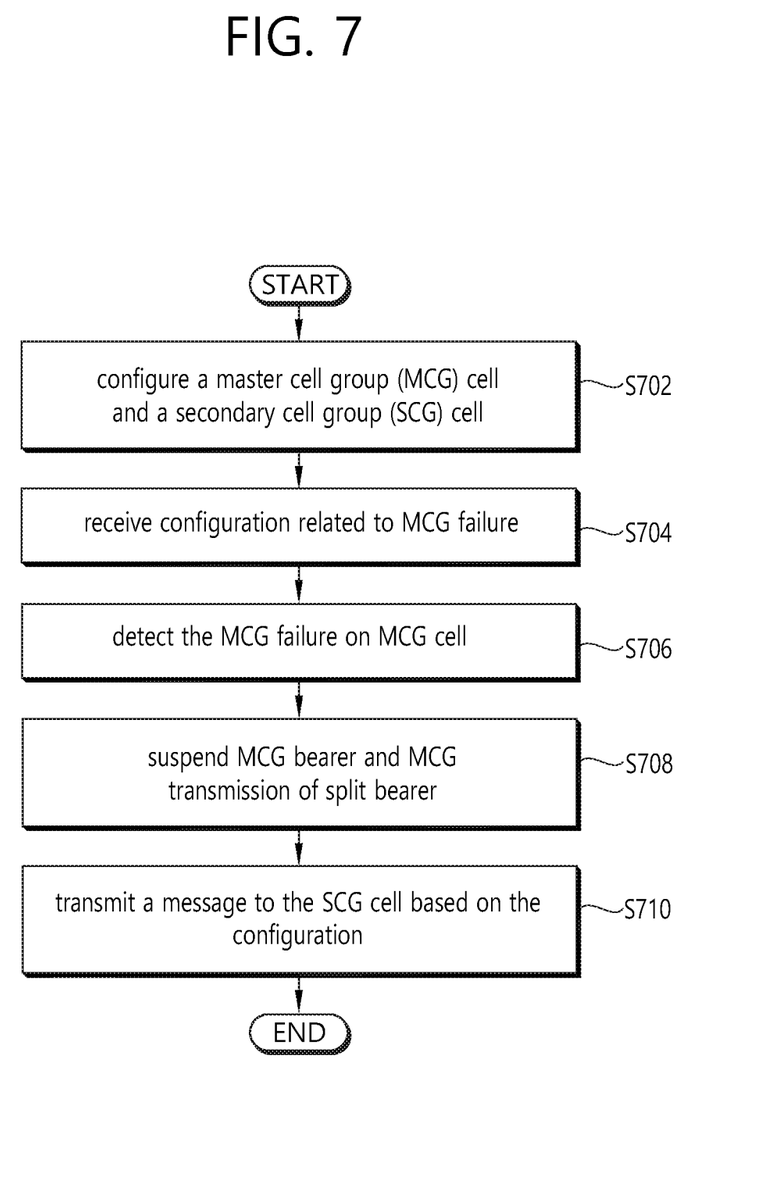
FIG. 7 shows a method for re-establishing RRC connection procedure according to an embodiment of the present invention

FIG. 7 shows a method for re-establishing RRC connection procedure according to an embodiment of the present invention. In this embodiment, the UE may communicate with at least one of a mobile terminal, a network or autonomous vehicles other than the UE.

In step S702, the UE may configure a master cell group (MCG) cell and a secondary cell group (SCG) cell. The UE may be configured to support dual connectivity (DC) for the MCG and the SCG. The SCG cell and the MCG cell may belong to different radio access technologies (RATs), respectively. The MCG may belong to a new radio access (NR) network and the SCG cell may belong to long-term evolution (LTE) network.

In step S704, the UE may receive configuration related to MCG failure. The configuration related to the MCG failure may inform whether the UE is allowed to select the SCG cell for a radio resource control (RRC) connection re-establishment procedure, when the MCG failure is detected. The MCG failure may be at least one of radio link failure on the MCG cell or handover failure on the MCG cell.

In step S706, the UE may detect the MCG failure on the MCG cell.

In step S708, the UE may suspend MCG bearer and MCG transmission of split bearer.

In step S710, the UE may transmit a message to the SCG cell based on the configuration.

Further, the UE may skip random access channel (RACH) procedure for a new cell other than the SCG cell.

According to embodiments of the present invention, when a failure on MCG cell is detected, the UE may skip re-accessing to a new cell by selecting the SCG cell as a new PCell.

Figure 8:
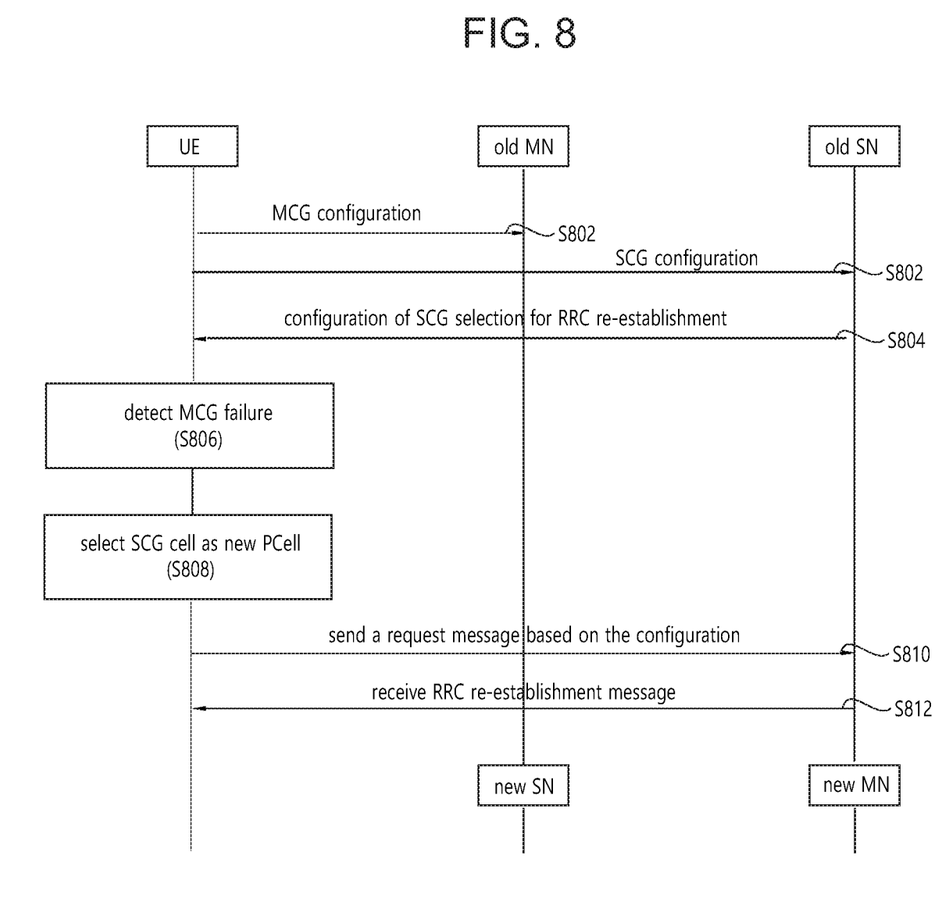
FIG. 8 shows a method for re-establishing RRC connection procedure according to an embodiment of the present invention

FIG. 8 shows a method for re-establishing RRC connection procedure according to an embodiment of the present invention.

In step S802, the UE may be configured with configuration of Master Cell Group (MCG) and configuration of Secondary Cell Group (SCG). The SCG may consist of one or more cells in different RATs than the MCG. In this embodiment, the MCG may consist of one or more NR cells while the SCG consists of one or more LTE cells. However, both MCG and SCG may belong to the same Core Network Node or the same Core Network Type such as 5GC. Alternatively, both MCG and SCG may belong to the same RAT.

In step S804, the UE may receive configuration of whether or not UE is allowed to select a SCG cell for RRC Connection Re-establishment. The SCG cell may be PSCell, a cell configured with PUCCH SR, or a cell configured with RACH resources. The configuration may be received from a MCG cell or a SCG cell. Master Node (MN) of MCG or Secondary Node (SN) of SCG may determine the configuration.

In step S806, the UE may detect radio link failure (RLF) on a MCG cell or Handover Failure. Alternatively, instead of detecting the failure related to MCG cell by itself, the UE may receive an indication that the RLF or handover failure on the MCG is occurred via the SCG cell.

In step S808, when UE detects radio link failure (RLF) on a MCG cell or Handover Failure, the UE may select the SCG cell as a new PCell. In specific, if UE detects radio link failure (RLF) on a MCG cell or Handover Failure, UE may suspend MCG legs of all split bearers and MCG direct bearers. After that, the UE may select the SCG cell as a new PCell. The UE may change the SCG cell (e.g. the PSCell) to the new PCell by selecting the SCG cell as a new PCell. In addition, UE may change the MCG PCell to the new PSCell when UE selects the SCG cell as a new PCell. In this case, the UE may not need to perform RACH procedure for new MCG.

In step S810, the UE may send a request message to the new PCell over a Signaling Radio Bearer (SRB) based on the configuration of SCG, without RACH procedure. If UE already has an uplink grant to send the request message, UE may send the request message on PUSCH without RACH procedure. If UE has no uplink grant to send the request message and a configured PUCCH SR, UE may trigger scheduling request on PUCCH to receive an uplink grant. If the uplink grant is received, UE may send the request message on PUSCH without RACH procedure. The configuration of SCG may include at least one of serving cell configuration, radio configuration, bearer configuration, PUCCH configuration, RACH configuration, physical layer configuration, MAC configuration, RLC configuration, PDCP configuration, and SDAP configuration. The SRB may be one of a new SRB, SRB0 on CCCH, SRB1 on DCCH, SRB2 on DCCH, and SRB3 on DCCH. If the SRB is SRB0 on CCCH, the request message may be transmitted on uplink resource of SCG without encryption. If the SRB is SRB1, SRB2 or SRB3, the request message may be transmitted with encryption based on the configuration of SCG or MCG. If the SRB is SRB1 or SRB2, the SRB may be a split SRB and the request message is transmitted over the SCG leg of the split SRB. If the SRB is the new SRB, UE may configure the SRB upon detection of Radio Link Failure on a MCG cell or Handover Failure or upon on selecting the SCG cell as a new PCell. Alternatively, UE may receive configuration of the SRB from MN or SN and then configures and suspends the SRB. Afterwards, the UE may resume the SRB to send the request message on the SRB upon detection of Radio Link Failure on a MCG cell or Handover Failure or upon on selecting the SCG cell as a new PCell. The request message may be the RRC Connection Re-establishment Request message. The request message may indicate MCG RLF, e.g. in a cause value or indicator. The request message may include C-RNTI allocated for SCG or C-RNTI allocated for MCG. Alternatively, the request message may include no UE ID.

In step S810, the UE may receive the RRC Re-establishment message from the new PCell. The RRC Re-establishment message may reconfigure bearers for the UE. The RRC Re-establishment message may reconfigure the new PSCell for the UE or change the new PSCell to another cell. If the RRC Re-establishment message rejects the request message, the UE may release all bearers and goes to RRC_IDLE. If UE receives the RRC Setup message instead of RRC Re-establishment message from the new PCell, UE may release all DRBs, apply configuration received from the RRC Setup message, enter RRC_CONNECTED state and then send RRC Setup Complete message.

In step S810, the UE may send the RRC Re-establishment Complete message to the new PCell.

According to embodiments of the present invention, when a failure on MCG cell is detected, the UE may skip re-accessing to a new cell by selecting the SCG cell as a new PCell.

Figure 9:
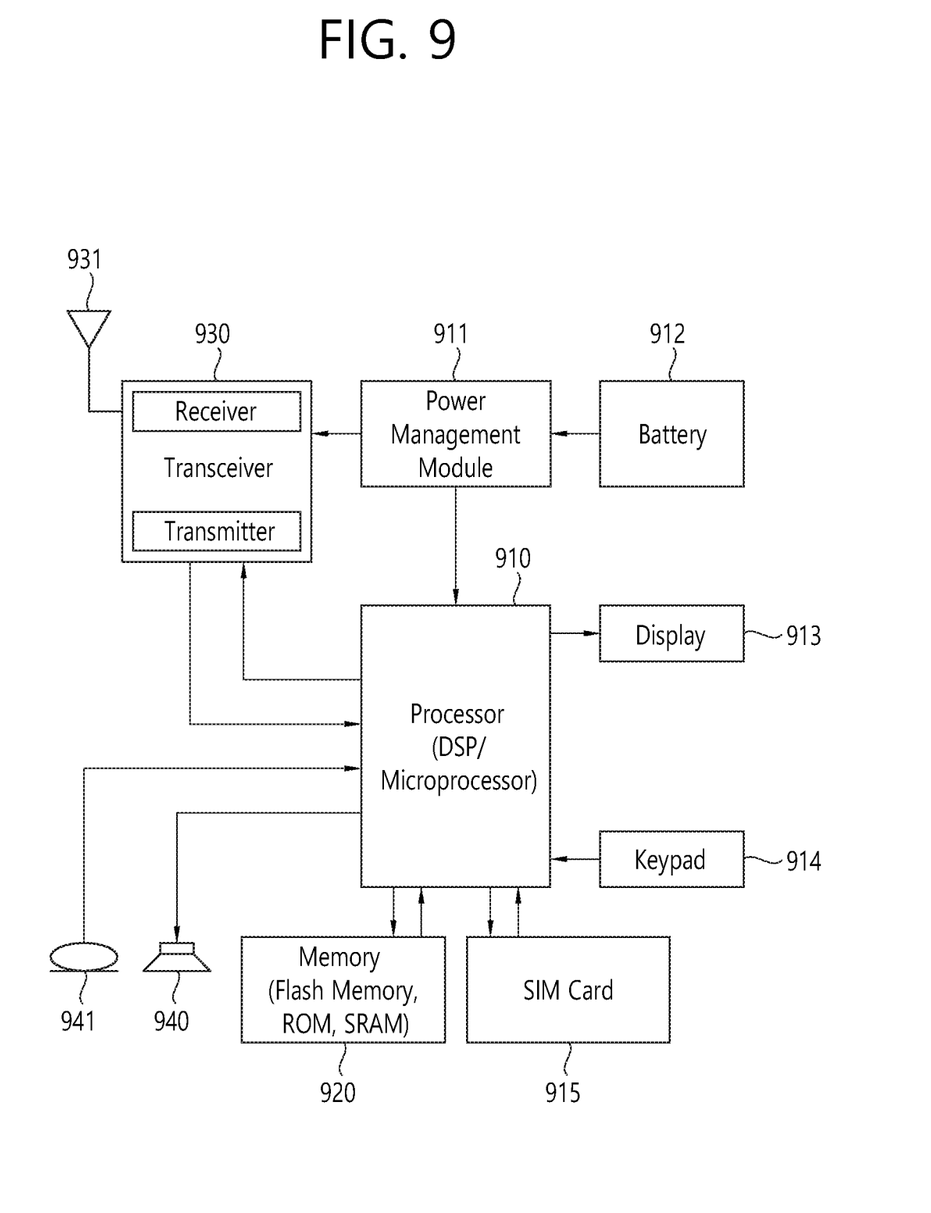
FIG. 9 shows more detailed UE to implement an embodiment of the present invention.

FIG. 9 shows more detailed UE to implement an embodiment of the present invention. The present invention described above for UE side may be applied to this embodiment.

A UE includes a processor 910, a power management module 911, a battery 912, a display 913, a keypad 914, a subscriber identification module (SIM) card 915, a memory 920, a transceiver 930, one or more antennas 931, a speaker 940, and a microphone 941.

The processor 910 may be configured to implement proposed functions, procedures and/or methods described in this description. Layers of the radio interface protocol may be implemented in the processor 910. The processor 910 may include ASIC, other chipset, logic circuit and/or data processing device. The processor 910 may be an application processor (AP). The processor 910 may include at least one of a digital signal processor (DSP), a central processing unit (CPU), a graphics processing unit (GPU), a modem (modulator and demodulator). An example of the processor 910 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 910 may be configured to configure a master cell group (MCG) cell and a secondary cell group (SCG) cell. The processor 910 may be configured to support dual connectivity (DC) for the MCG and the SCG. The SCG cell and the MCG cell may belong to different radio access technologies (RATs), respectively. The MCG may belong to long-term evolution (LTE) network and the SCG cell may belong to a new radio (NR) network.

The processor 910 may be configured to receive configuration related to MCG failure. The configuration related to the MCG failure may inform whether the UE is allowed to select the SCG cell for a radio resource control (RRC) connection re-establishment procedure, when the MCG failure is detected. The MCG failure may be at least one of radio link failure on the MCG cell or handover failure on the MCG cell.

The processor 910 may be configured to detect the MCG failure on the MCG cell.

The processor 910 may be configured to suspend MCG bearer and MCG transmission of split bearer.

The processor 910 may be configured to transmit a message to the SCG cell based on the configuration.

Further, the processor 910 may be configured to may skip random access channel (RACH) procedure for a new cell other than the SCG cell.

According to embodiments of the present invention, when a failure on MCG cell is detected, the UE may skip re-accessing to a new cell by selecting the SCG cell as a new PCell.

The power management module 911 manages power for the processor 910 and/or the transceiver 930. The battery 912 supplies power to the power management module 911. The display 913 outputs results processed by the processor 910. The keypad 914 receives inputs to be used by the processor 910. The keypad 914 may be shown on the display 913. The SIM card 915 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 920 is operatively coupled with the processor 910 and stores a variety of information to operate the processor 910. The memory 920 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 920 and executed by the processor 910. The memory 920 can be implemented within the processor 910 or external to the processor 910 in which case those can be communicatively coupled to the processor 910 via various means as is known in the art.

The transceiver 930 is operatively coupled with the processor 910, and transmits and/or receives a radio signal. The transceiver 930 includes a transmitter and a receiver. The transceiver 930 may include baseband circuitry to process radio frequency signals. The transceiver 930 controls the one or more antennas 931 to transmit and/or receive a radio signal.

The speaker 940 outputs sound-related results processed by the processor 910. The microphone 941 receives sound-related inputs to be used by the processor 910.

Figure 10:
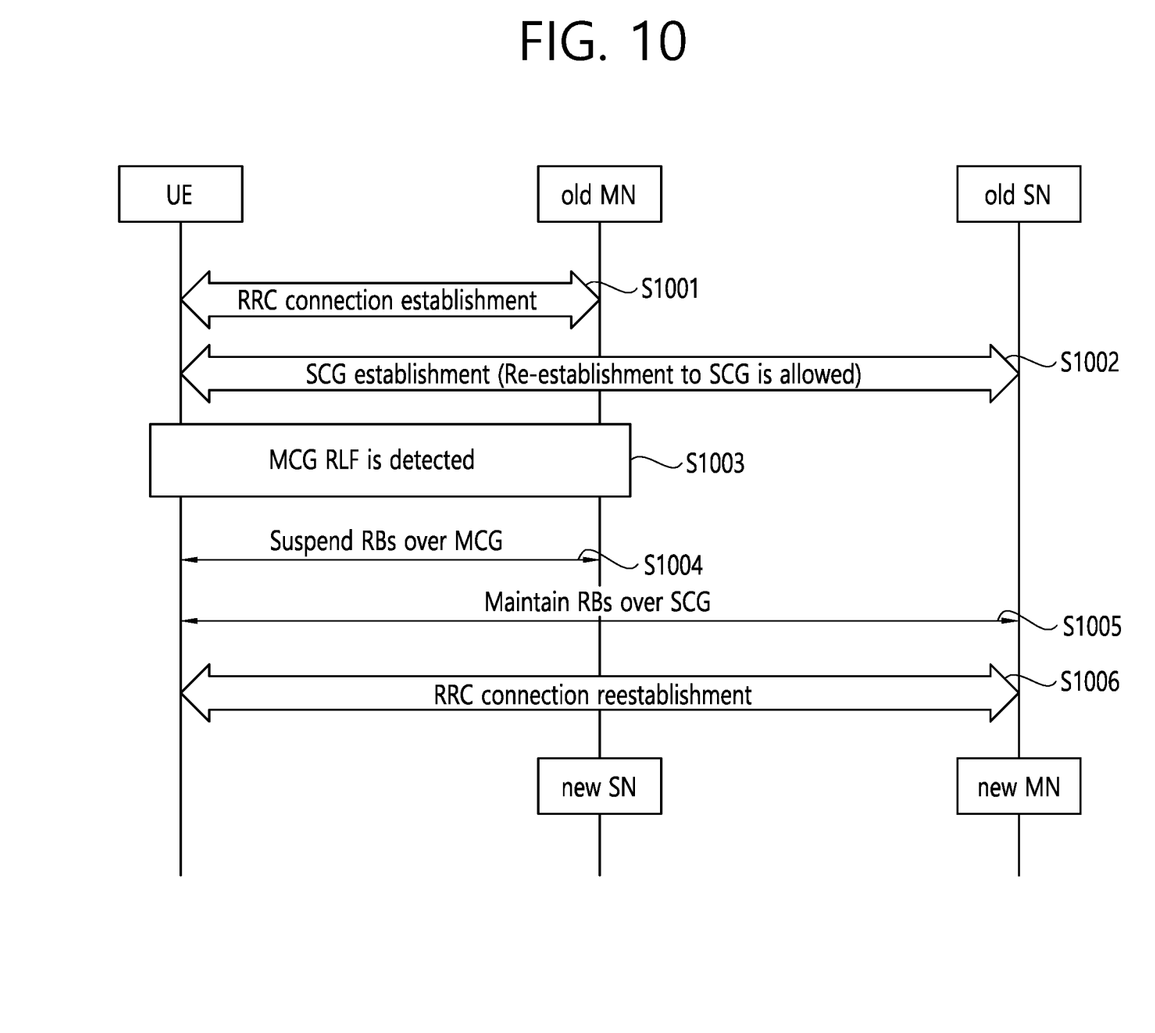
FIG. 10 shows a method for re-establishing RRC connection procedure according to an embodiment of the present disclosure.

FIG. 10 shows a method for re-establishing RRC connection procedure according to an embodiment of the present disclosure.

For example, in FIG. 10, an old MCG (for example, old master node (MN)) may be gNB while new SCG (for example, new secondary node (SN)) may be eNB.

In step S1001, the UE may perform RRC connection establishment with the old MN.

In step S1002, the UE may perform SCG establishment with the old SN (for example, re-establishment to SCG is allowed).

In step S1003, the MCG RLF may be detected. For example, the UE may detect the MCG RLF with the old MN.

In step S1004, the UE may suspend RBs over MCG. For example, the UE may suspend one or more MCG bearers and MCG transmission of one or more split bearers.

In step S1005, the UE may maintain RBs over SCG. For example, the UE may maintain one or more SCG bearers and SCG transmission of one or more split bearers.

In step S1006, the UE may perform RRC connection reestablishment with the old SN as a new MN.

According to embodiments of the present invention, when a failure on MCG cell is detected, the UE may skip re-accessing to a new cell by selecting the SCG cell as a new PCell.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a wireless device in a wireless communication system, the method comprising:
   configuring a master cell group (MCG) cell and a secondary cell group (SCG) cell;
   detecting an MCG failure on the MCG cell,
   wherein the MCG failure corresponds to one of a radio link failure on the MCG cell or handover failure;
   suspending MCG bearer and MCG transmission of one or more split bearers;
   maintaining SCG bearer and SCG transmission of at least one of the one or more split bearers;
   constructing a message indicating a cause of the failure;
   encrypting the message based on a configuration of MCG;
   transmitting the message to the SCG cell via the maintained SCG transmission of the at least one of the one or more split bearers that is one type of Signaling Radio Bearers (SRB);
   receiving information informing that the wireless device is allowed to select the SCG cell as a new primary cell (PCell); and
   selecting the SCG cell as the new PCell of a new MCG based on the received information,
   wherein the MCG cell and the SCG cell belong to different radio technologies.

2. The method of claim 1, wherein the wireless device is configured to support dual connectivity (DC) for the MCG and the SCG.

3. The method of claim 1, wherein the information is transmitted from the MCG.

4. The method of claim 1, further comprising:
   skipping random access channel (RACH) procedure for a new cell other than the SCG cell.

5. The method of claim 1, wherein the wireless device communicates with at least one of a mobile terminal, a network or autonomous vehicles other than the wireless device.

6. A wireless device in a wireless communication system, the wireless device comprising:
   a transceiver for transmitting or receiving a radio signal; and
   a processor coupled to the transceiver,
   the processor configured to:
   configure a master cell group (MCG) cell and a secondary cell group (SCG) cell;
   detect an MCG failure on the MCG cell,
   wherein the MCG failure corresponds to one of a radio link failure on the MCG cell or handover failure;
   suspend MCG bearer and MCG transmission of one or more split bearers;
   maintain SCG bearer and SCG transmission of at least one of the one or more split bearers;
   construct a message indicating a cause of the failure;
   encrypt the message based on a configuration of MCG;
   control the transceiver to transmit the message to the SCG cell via the maintained SCG transmission of the at least one of the one or more split bearers that is one type of Signaling Radio Bearers (SRB);
   control the transceiver to receive information informing that the wireless device is allowed to select the SCG cell as a new primary cell (PCell); and
   select the SCG cell as the new PCell of a new MCG based on the received information,
   wherein the MCG cell and the SCG cell belong to different radio technologies.

7. The wireless device of claim 6, wherein the wireless device is configured to support dual connectivity (DC) for the MCG and the SCG.

8. A processor for a wireless communication device in a wireless communication system,
   wherein the processor is configured to control the wireless communication device to:
   configure a master cell group (MCG) cell and a secondary cell group (SCG) cell;
   detect an MCG failure on the MCG cell,
   wherein the MCG failure corresponds to one of a radio link failure on the MCG cell or handover failure;
   suspend MCG bearer and MCG transmission of one or more split bearers;
   maintain SCG bearer and SCG transmission of at least one of the one or more split bearers;
   construct a message indicating a cause of the failure;
   encrypt the message based on a configuration of MCG;
   transmit the message to the SCG cell via the maintained SCG transmission of the at least one of the one or more split bearers that is one type of Signaling Radio Bearers (SRB);
   receive information informing that the wireless device is allowed to select the SCG cell as a new primary cell (PCell); and
   select the SCG cell as the new PCell of a new MCG based on the received information,
   wherein the MCG cell and the SCG cell belong to different radio technologies.

* * * * *